(12) United States Patent
Shimizu et al.

(10) Patent No.: US 7,940,629 B2
(45) Date of Patent: May 10, 2011

(54) INFORMATION RECORDING APPARATUS AND INFORMATION REPRODUCING APPARATUS

(75) Inventors: Yoshie Shimizu, Ibaraki (JP); Takeshi Endo, Osaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 726 days.

(21) Appl. No.: 11/900,290

(22) Filed: Sep. 11, 2007

(65) Prior Publication Data

US 2008/0130463 A1 Jun. 5, 2008

(30) Foreign Application Priority Data

Sep. 12, 2006 (JP) ................................. 2006-246447

(51) Int. Cl.
*G11B 7/00* (2006.01)
(52) U.S. Cl. ...................... 369/112.01; 359/35; 359/868
(58) Field of Classification Search ........................ None
See application file for complete search history.

(56) References Cited

U.S. PATENT DOCUMENTS 6,058,232 A * 5/2000 Lee et al. ......................... 385/39
2006/0215286 A1* 9/2006 Okada et al. .................. 359/868

OTHER PUBLICATIONS

H. Horimai et al., "Holographic Medium about to Take Off: 20 Gigabyte to be realized in 2006", Nikkei Electronics, Nikkei Business Publications, Inc., Jan. 17, 2005, No. 891, pp. 105-114; Together with an English-language translation of relevant parts.

* cited by examiner

*Primary Examiner* — Van N Chow
(74) *Attorney, Agent, or Firm* — Sidley Austin LLP

(57) ABSTRACT

Information light modulated and emitted by a modulation element is led to a recording medium through a Fourier transform optical system and an optical path shifter. An interference image is recorded on the recording medium by interference of the information light and reference light. A deflection unit of the optical path shifter has a pair of prisms. Optical path of information light transmitted through the respective prisms are shifted in parallel in a direction perpendicular to an optical axis of the Fourier transform optical system. By rotating the deflection unit around the optical axis, it is possible to shift the optical path of the information light around the optical axis while shifting the optical path in the direction perpendicular to the optical axis. Therefore, it is unnecessary to perform complicated control and it is possible to multiply record an interference image accurately with an information recording apparatus having a simple structure.

22 Claims, 13 Drawing Sheets

DISK ROTATION

*PRIOR ART*

*PRIOR ART*

PRIOR ART

PRIOR ART

INFORMATION RECORDING APPARATUS AND INFORMATION REPRODUCING APPARATUS

The present application is based on Japanese Patent Application No. 2006-246447 filed on Sep. 12, 2006 in Japan, the entire content of which is incorporated herein by reference.

BACKGROUND OF THE INVENTION

1. Field of the Invention

The present invention relates to an information recording apparatus that causes information light and reference light to interfere with each other to thereby record an interference image on a recording surface of a recording medium and an information reproducing apparatus that reproduces information included in the interference image recorded on the recording medium.

2. Description of the Related Art

Various apparatuses that record information on a recording surface of a recording medium as an interference image and reproduce the information recorded as the interference image have been proposed. Some of the apparatuses are disclosed in, for example, Non-Patent Document 1. The Non-Patent Document 1 is the following document.

Non-Patent Document 1: Hideyoshi Horimai, et al., "Holographic Medium about to Take Off: 200 Gigabyte to be realized in 2006" Nikkei Electronics, Nikkei Business Publications, Inc., Jan. 17, 2005, No. 891, p. 105 to 114

FIG. 13 is a diagram for schematically explaining a structure of a main part of an information recording apparatus disclosed in the Non-Patent Document 1. In this apparatus, light emitted from a not-shown light source is split into two light beams by a beam splitter 101. One of the light beams is modulated according to a pattern displayed on an SLM (Spatial Light Modulator) 102 and emitted as information light. The information light is made incident on a recording medium 104 through an object lens 103. On the other hand, the other light beam split by the beam splitter 101 is made incident on the recording medium 104 as reference light through optical members such as lenses and a mirror. On the recording medium 104, the information light and the reference light interfere with each other and information corresponding to the display pattern is recorded as an interference image (an interference fringe).

When the reference light is irradiated on the recording medium 104 in a direction same as that during recording, light is reproduced from the recording medium 104. This light is focused on a light-receiving element 106 made of, for example, CMOS, through the object lens 105. This makes it possible to read out (reproduce) the information recorded on the recording medium 104 as a two-dimensional image.

FIGS. 14A and 14B are perspective views schematically showing a structure of a main part of another information recording apparatus disclosed in the Non-Patent Document 1. In this apparatus, during recording of information, as shown in FIG. 14A, a pattern for information light 201a is displayed in the center of an SLM 201 and, on the other hand, a pattern for reference light 201b is displayed on a periphery of the SLM 201. A laser beam is irradiated on the SLM 201 from a light source (not shown). Information light (light in the center of the laser beam) and reference light (light in a periphery of the laser beam) are emitted from the SLM 201. These lights are converged by an object lens 202 and condensed on a recording surface of the recording medium 203. In this case, the information light and the reference light interfere with each other, whereby information corresponding to the pattern 201a is recorded as an interference image on the recording surface.

On the other hand, during reproduction of information, as shown in FIG. 14B, only the pattern for reference light 201b same as that during recording is displayed on the SLM 201 and a laser beam from the light source is irradiated on the SLM 201. In this case, only the reference light is emitted from the SLM 201 and irradiated on the recording medium 203 through a beam splitter 204 and an object lens 202. Light having the information recorded as the interference image is reproduced from the recording medium 203. The reproduced light returns in the direction of the object lens 202, changes the direction in the beam splitter 204, and is received by a light-receiving element 205. In the light-receiving element 205, a reproduced image is detected as a two-dimensional image.

In recording information on a recording medium using the holographic technique described above, for example, as shown in FIG. 15, by shifting a recording medium 302 by a very small distance every time when an interference image 301 is recorded, it is possible to multiply record the interference image 301 to thereby increase a recording capacity of the recording medium 302. In such a shift multiple recording system, according to rotational or parallel shift of the recording medium 302, it is possible to record the interference image 301 such that spots S are arranged in a spiral shape as shown in FIG. 16 or record the interference image 301 such that the spots S are arranged in a concentric circle shape as shown in FIG. 17.

However, since the recording medium is generally large, in rotating the recording medium to multiply record an interference image, a state of the recording medium during the rotation (warp, eccentricity, swing, etc. of the recording medium) substantially affects the recording of the interference image. Therefor, in order to accurately record the interference image, it is necessary to perform rotation control always taking into account the state of the recording medium. As a result, the control and the structure of the apparatus are complicated.

SUMMARY OF THE INVENTION

The invention has been devised to solve the problems described above and it is an object of the invention to provide an information recording apparatus that makes it unnecessary to perform complicated control and can multiply record an interference image accurately with a simple structure and an information reproducing apparatus that can reproduce information included in the interference image multiply recorded in that way.

In order to attain the object, an information recording apparatus according to the invention that causes information light and reference light to interfere with each other and records an interference image on a recording medium includes a light source that emits coherent light, a modulation element that modulates incident light to emit modulated light as information light having information that should be recorded on the recording medium, a splitting optical system that splits the light emitted from the light source into two light beams, leads one of the light beams to the modulation element, and leads the other to the recording medium as reference light, a Fourier transform optical system that leads the light emitted from the modulation element to the recording medium, and an optical path shifter that shifts, every time an interference image is recorded, an optical path of the light, which is led from the Fourier transform optical system to the recording medium, around an optical axis of the Fourier transform optical system while shifting the optical path in a direction perpendicular to the optical axis.

An information recording apparatus according to the invention that causes information light and reference light to interfere with each other and records an interference image on a recording medium includes a light source that emits coherent light, a modulation element that modulates a part of light emitted from the light source to emit modulated light as information light having information that should be recorded on the recording medium and modulates a remainder of the light when necessary to emit the remainder of the light either modulated or intact as reference light, a Fourier transform optical system that leads the light emitted from the modulation element to the recording medium, and an optical path shifter that shifts, every time an interference image is recorded, an optical path of the light, which is led from the Fourier transform optical system to the recording medium, around an optical axis of the Fourier transform optical system while shifting the optical path in a direction perpendicular to the optical axis.

An information reproducing apparatus according to the invention that reproduces information recorded on a recording medium as an interference image includes a light source that emits coherent light, a reference-light irradiation optical system that leads a part of the light emitted from the light source to a recording medium as reference light, an inverse Fourier transform optical system that subjects light reproduced from the recording medium when the reference light is irradiated on the recording medium to inverse Fourier transform, a readout unit that receives the reproduced light through the inverse Fourier transform optical system and reads out the information recorded as the interference image, and an optical path shifter that shifts, every time the information is reproduced, an optical path between the recording medium and the inverse Fourier transform optical system around an optical axis of the inverse Fourier transform optical system while shifting the optical path in a direction perpendicular to the optical axis.

According to the invention, it is possible to multiply record the interference image without shifting the recording medium as much as possible (even in a state in which the recording medium is kept stationary). Thus, it is possible to record the interference image in a state in which external factors affecting the recording of the interference image are eliminated. This makes it unnecessary to perform complicated control for reducing the influence of the external factors and makes it possible to multiply record the interference image on the recording medium accurately with a simple structure in which an optical path shifter is provided. Further, since it is possible to reproduce (read out) the information included in the interference image multiply recorded on the recording medium without shifting the recording medium as much as possible, it is possible to accurately reproduce the information.

DESCRIPTION OF THE DRAWINGS

The above-mentioned and other objects and characteristics of the invention will be made clearer by referring to the following description about preferred embodiments and the accompanying drawings.

DESCRIPTION OF THE PREFERRED EMBODIMENTS

First Embodiment

An embodiment of the invention is explained below with reference to the drawings.
(1. Overview of an Information Recording Apparatus)

Figure 2:
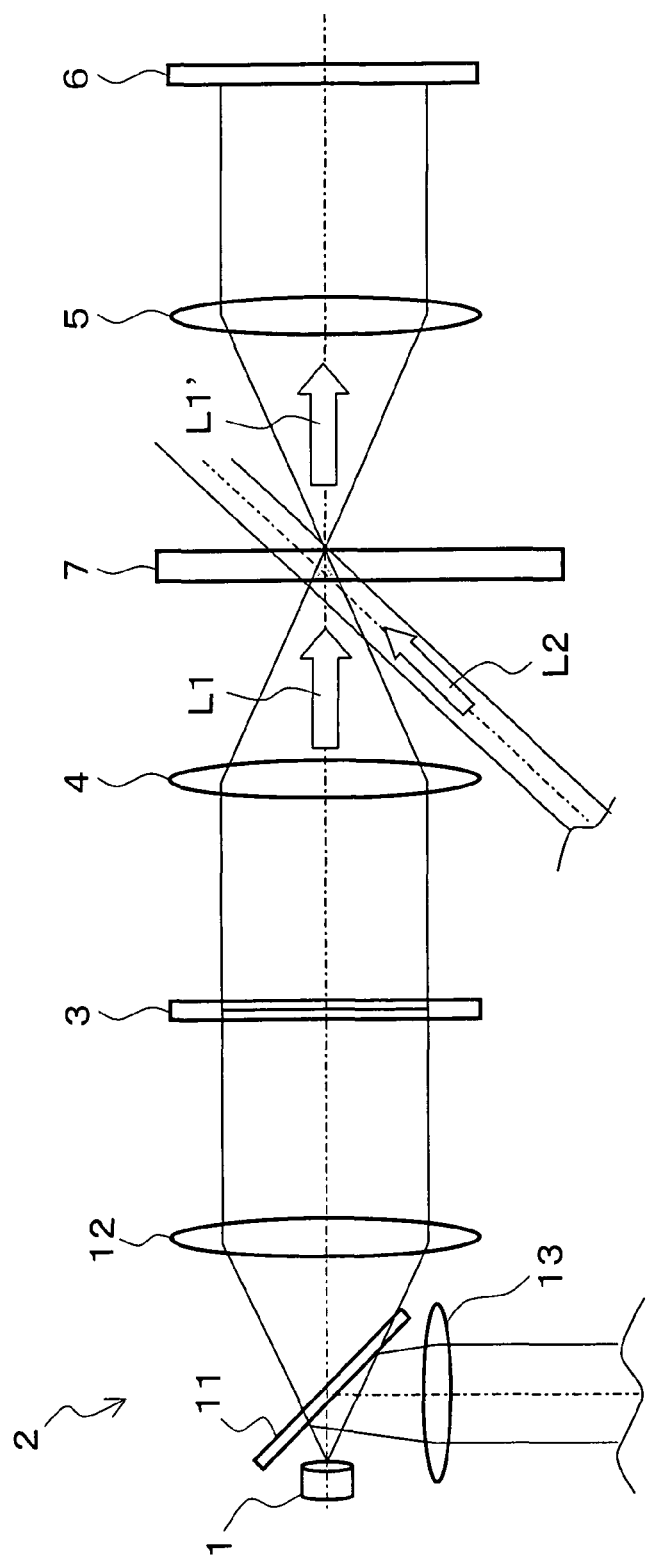
FIG. 2 is an explanatory diagram showing an overall structure of the information recording apparatus.

FIG. 2 is an explanatory diagram showing an overall structure of an information recording apparatus according to this embodiment. This information recording apparatus causes information light L1 and reference light L2 to interfere with each other to thereby record information on a recording medium 7 as an interference image and reproduce the information of the recorded interference image. The information recording apparatus includes a light source 1, a splitting optical system 2, a modulation element 3, Fourier transform optical systems 4 and 5, and a readout unit 6.

An optical path shifter 20 (a first optical path shifter; see FIG. 1), which is a characteristic of the invention, is arranged in an optical path between the Fourier transform optical system 4 (a first Fourier transform optical system) and the recording medium 7. An optical path shifter (a second optical path shifter) equivalent to the optical path shifter 20 is arranged in an optical path between the recording medium 7 and the Fourier transform optical system 5 (a second Fourier transform optical system). However, these optical path shifters are not shown in FIG. 2. Details of the optical path shifter 20 are described later.

The light source 1 includes a laser beam source that emits coherent light. The splitting optical system 2 is an optical system that splits light emitted from the light source 1 into two light beams, leads one of the light beams to the modulation element 3, and leads the other to the recording medium 7 as the reference light L2.

More specifically, the splitting optical system 2 includes a half mirror 11 and collimator lenses 12 and 13. The half mirror 11 splits the light emitted from the light source 1 into two light beams, transmits one of the light beams, and reflects the other. The collimator lens 12 converts the light beam transmitted through the half mirror 11 into parallel light and leads the parallel light to the modulation element 3. The collimator lens 13 converts the light beam reflected by the half mirror 11 into parallel light and leads the parallel light to the recording medium 7 as the reference light L2. Other optical elements such as lenses and a reflection mirror may be arranged in an optical path of the reference light L2. The reference light L2 finally made incident on the recording medium 7 is parallel light in this embodiment.

The modulation element 3 (modulating means) modulates light made incident thereon through the splitting optical system 2 and emits the modulated light as the information light L1 having information that should be recorded on the recording medium 7. In this embodiment, the modulation element 3 is, for example, an optical modulation element (a spatial phase modulator) including a transmission liquid crystal display device. On the modulation element 3, the information that should be recorded on the recording medium 7 is displayed as two-dimensional data represented by ON/OFF of respective pixels.

The Fourier transform optical system 4 is an optical system that subjects light emitted from the modulation element 3 to Fourier transform and leads the light to the recording medium 7. On the other hand, the Fourier transform optical system 5 is an optical system that subjects light reproduced from the recording medium 7 to inverse Fourier transform and leads the light to the readout unit 6. Both the Fourier transform optical systems 4 and 5 are telecentric optical systems. It is desirable that the Fourier transform optical systems 4 and 5 are designed to correct spherical aberration caused in the optical path shifter 20.

The readout unit 6 is readout means for receiving, on a readout surface thereof, light reproduced from the recording medium 7 when the reference light L2 same as that during recording of the interference image is irradiated on the recording medium 7 to thereby read out the information recorded as the interference image. The readout unit 6 includes a two-dimensional CMOS image sensor and a control unit.

Figure 1:
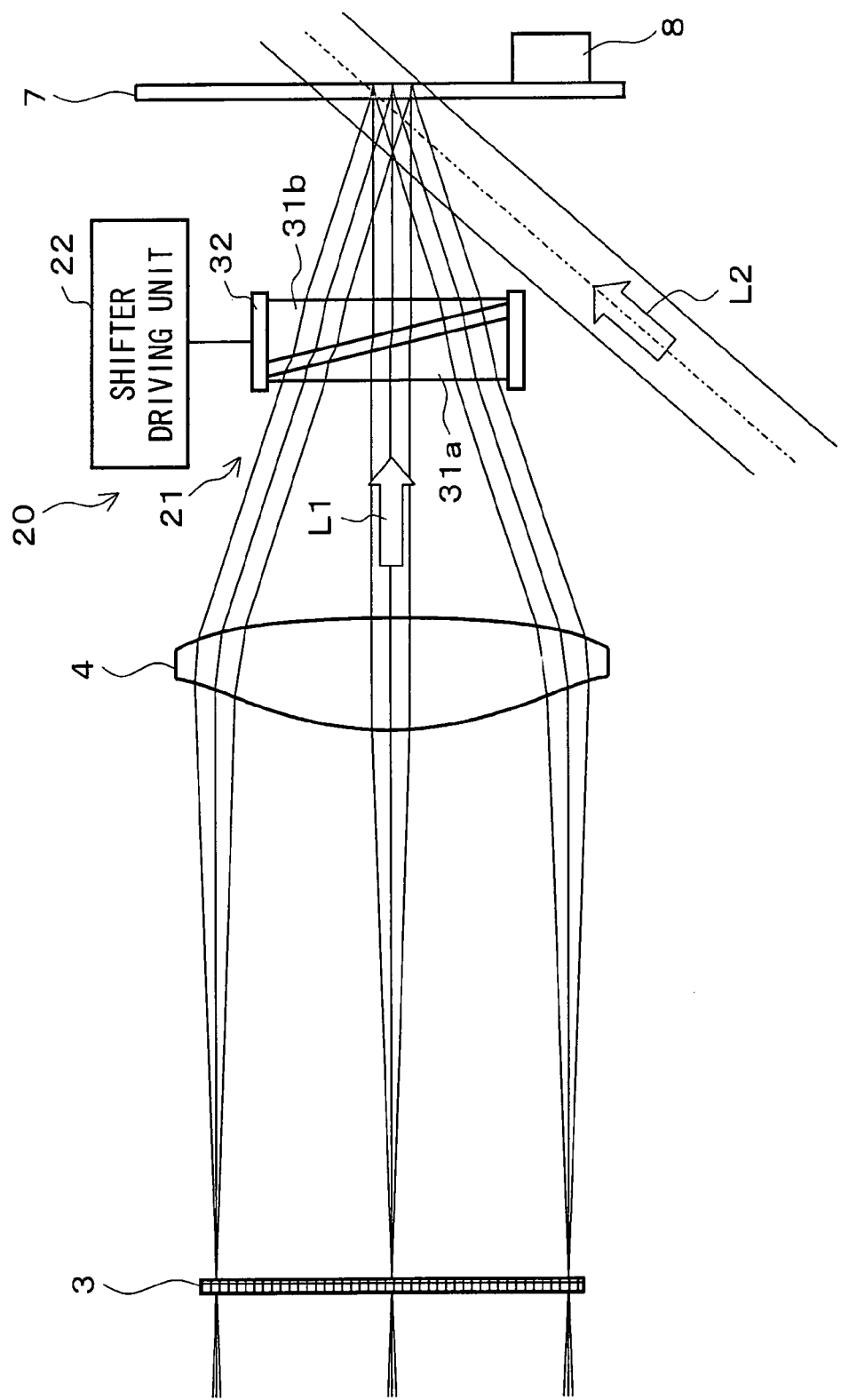
FIG. 1 is an explanatory diagram showing a schematic structure of a main part of an information recording apparatus according to an embodiment of the invention.

The information recording apparatus according to this embodiment further includes a disk driving unit 8 (see FIG. 1). The disk driving unit 8 shifts (e.g., rotates) the recording medium 7. The disk driving unit 8 is provided for the purpose of shifting the recording medium 7 simultaneously with optical path shift by the optical path shifter 20 described later. Details of the disk driving unit 8 are described later.

In the information recording apparatus described above, the light emitted from the light source 1 is split into two light beams by the half mirror 11 of the splitting optical system 2. One of the light beams is converted into parallel light by the collimator lens 12, then, modulated by the modulation element 3 according to display data, and emitted as the information light L1. The light made incident on the modulation element 3 is diffracted at an angle corresponding to a pixel size when the light is transmitted through respective pixels. The information light L1 modulated by the modulation element 3 and diffracted is made incident on the recording medium 7 through the Fourier transform optical system 4 and the optical path shifter 20 described later.

On the other hand, the other light beam split by the half mirror 11 is converted into parallel light by the collimator lens 13 and is then made incident on the recording medium 7 as the reference light L2 through the optical elements such as the reflection mirror. On the recording medium 7, an interference image (an interference fringe) is recorded by the interference of the information light L1 and the reference light L2.

When information of the interference image is reproduced, the reference light L2 is irradiated on the recording medium 7, in which the interference image is recorded, from a direction identical with that during recording, whereby light L1' having the information is reproduced from the recording medium 7. The reproduced light L1' is made incident on the Fourier transform optical system 5 through the optical path shifter, subjected to inverse Fourier transform by the Fourier transform optical system 5, and then received on the readout surface of the readout unit 6. Consequently, a reproduced image is detected as two-dimensional image data.

(2. Optical Path Shifter)

The optical path shifter 20 is explained. The optical path shifter 20 arranged in the optical path between the Fourier transform optical system 4 and the recording medium 7 is explained here. However, the optical path shifter arranged in the optical path between the recording medium 7 and the Fourier transform optical path 5 can adopt a structure same as that of the optical path shifter 20.

FIG. 1 is an explanatory diagram showing a schematic structure of a main part of the information recording apparatus according to this embodiment. The optical path shifter 20 included in the information recording apparatus is optical path shifting means for shifting, every time an interference image is recorded, the optical path of the light (the information light L1), which is led from the Fourier transform optical system 4 to the recording medium 7, around an optical axis of the Fourier transform optical system 4 while shifting the optical path in a direction perpendicular to the optical axis. The optical path shifter 20 includes a deflection unit 21 and a shifter driving unit 22.

The deflection unit 21 is deflecting means for translating the optical path of the light, which is led from the Fourier transform optical system 4 to the recording medium 7, in the direction perpendicular to the optical axis of the Fourier transform optical system 4. In this embodiment, the deflection unit 21 includes a pair of prisms 31a and 31b, which are deflection optical elements, and a holding frame 32.

The prisms 31a and 31b have an identical shape and are arranged such that slopes thereof are opposed to each other via a void. The prism 31b is arranged to be plane symmetrical to the prism 31a with respect to a surface perpendicular to the optical axis of the Fourier transform optical system 4 when the prism 31a is rotated 180 degrees around the optical axis. Antireflection coating is applied to the surfaces of the prisms 31a and 31b.

The holding frame 32 is a frame that holds the prisms 31a and 31b and formed around the optical axis of the Fourier transform optical system 4. Therefore, the prisms 31a and 31b are located further on an inner side (the optical axis side) than the holding frame 32.

The shifter driving unit 22 is driving means for rotating the deflection unit 21 (with the optical axis as a rotation axis) around the optical axis of the Fourier transform optical system 4 every time an interference image is recorded, and includes a gear and a motor. For example, an outer surface of the holding frame 32 is formed in a gear shape (a convexo-concave shape) and the gear of the shifter driving unit 22 is meshed with the outer surface. This makes it possible to transmit the torque of the motor to the deflection unit 21 and rotate the deflection unit 21 around the optical axis.

With such a structure of the optical path shifter 20, the information light L1 from the Fourier transform optical system 4 is refracted when the information light L1 is transmitted through the prisms 31a and 31b of the deflection unit 21. In this case, since the Fourier transform optical system 4 is a telecentric optical system, lights (diffractive lights of the 0th order, the first order, and the like) emitted from arbitrary pixels of the modulation element 3 are transmitted through the Fourier transform optical system 4 and then the diffractive lights of each of the orders become parallel to one another. This holds true for lights emitted from all pixels of the modulation element 3 (at all image heights, the diffractive lights of each of the 0th order, the ±first order, and the like become parallel to one another). Therefore, when the information light L1 emitted from the modulation element 3 is transmitted through the prisms 31a and 31b, an optical path of the information light L1 is shifted in parallel in the direction perpendicular to the optical axis of the Fourier transform optical system 4. The information light L1, the optical path of which is shifted in this way, and the reference light L2 interfere with each other, whereby an interference image is recorded on the recording medium 7.

Figure 3:
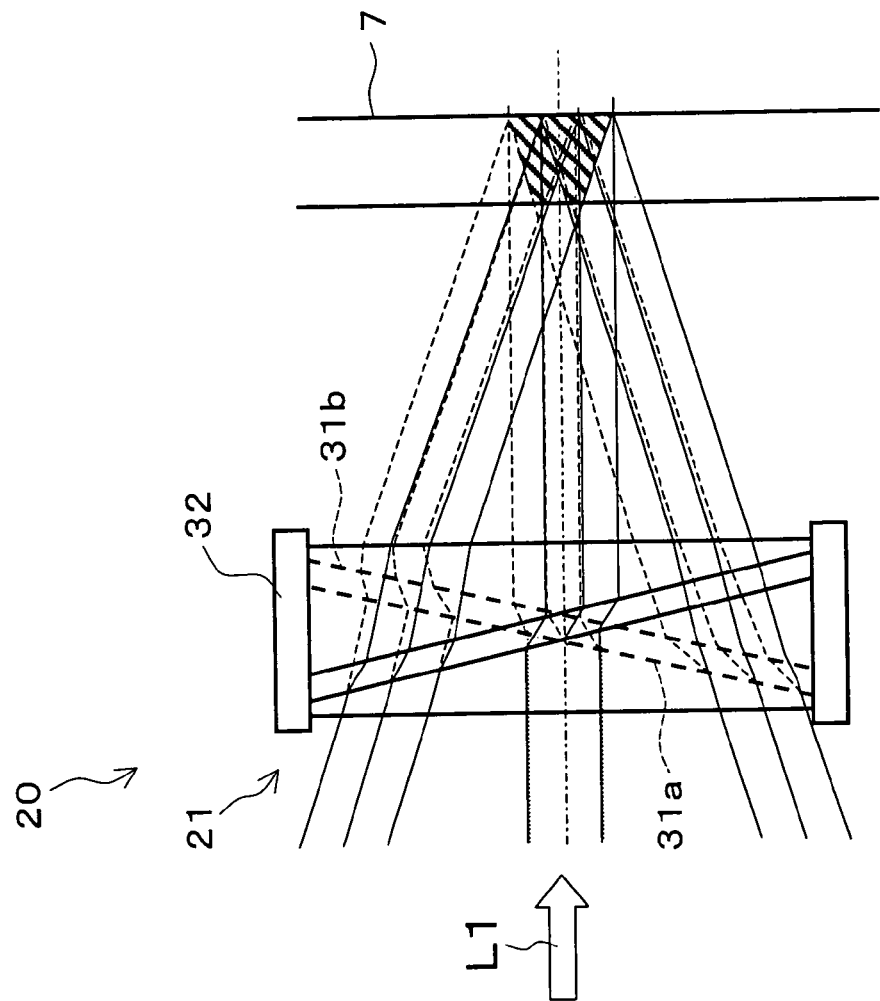
FIG. 3 is an explanatory diagram showing optical paths of lights made incident on a recording medium before and after a deflection unit of an optical path shifter included in the information recording apparatus is rotated.

For example, FIG. 3 shows optical paths of lights made incident on the recording medium 7 before and after the deflection unit 21 is rotated 180 degrees around the optical axis. The prisms 31a and 31b of the deflection unit 21 before rotating and the optical paths of the lights transmitted through the prisms are indicated by solid lines. The prisms 31a and 31b after the deflection unit 21 is rotated 180 degrees from that state and the optical paths of the lights transmitted through the prisms are indicated by broken lines. An alternate long and short dash line in the figure indicates the optical axis of the Fourier transform optical system 4.

As described above, in the deflection unit 21, the pair of prisms 31a and 31b are arranged to be opposed to each other via the void. Thus, depending on a position of the rotation of the prisms 31a and 31b around the optical axis of the Fourier transform optical system 4, a direction in which the optical path of the information light L1 is shifted is different among various directions perpendicular to the optical axis. Therefore, it is possible to shift a recording position of an interference image around the optical axis by rotating the deflection unit 21 with the optical axis of the Fourier transform optical system 4 as a rotation axis using the shifter driving unit 22.

Figure 4:
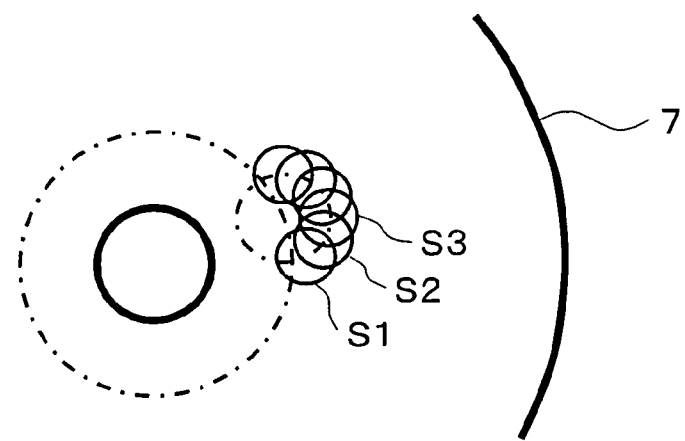
FIG. 4 is a plan view schematically showing a state in which the deflection unit is rotated to multiply record plural interference images.

FIG. 4 is a plan view schematically showing a state in which the deflection unit 21 is rotated around the optical axis to multiply record plural interference images every time an interference image is recorded. By rotating the deflection unit 21 at a fixed rotation angle around the optical axis every time an interference image is recorded in this way, it is possible to shift positions of recording spots S1, S2, S3, and the like of the interference image in a circular shape at fixed intervals around the optical axis to multiply record plural interference images. For example, if the deflection unit 21 is rotated by one degree around the optical axis every time an interference image is recorded, it is possible to multiply record 360 interference images around the optical axis.

In order to multiply record an interference image around the optical axis, an amount of shift around the optical axis of the interference image due to the rotation of the deflection unit 21 needs to be smaller than a diameter of recording spots of the interference image. Thus, the rotation angle of the deflection unit 21 only has to be set in association with such an amount of shift. When recording spot positions completely overlap one another, it is impossible to read out pieces of information of the interference image separately from one another. Thus, it is necessary to control the rotation angle of the deflection unit 21 to prevent the recording spot positions from overlapping one another.

Figure 5:
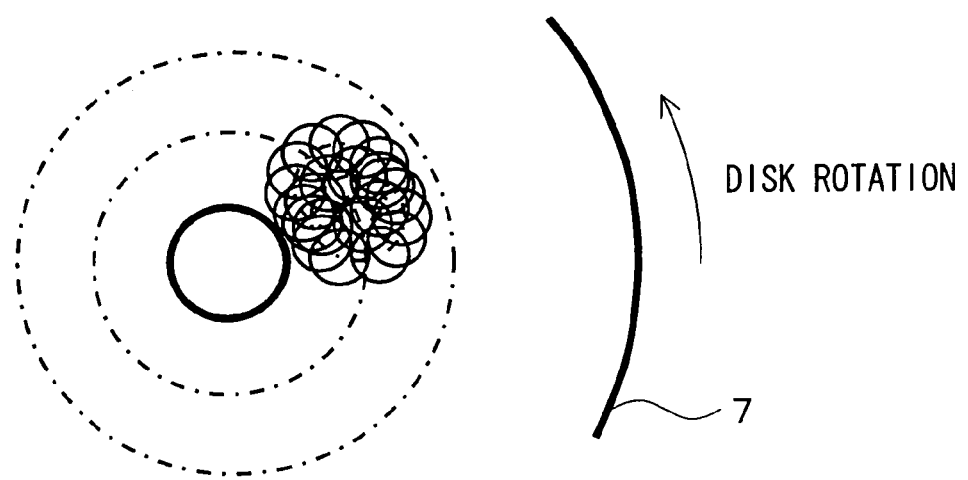
FIG. 5 is a plan view schematically showing recording spots of plural interference images recorded before and after a recording medium is rotated.

When the deflection unit 21 is rotated once, the recording medium 7 is rotated at a predetermined angle to be stationary by the disk driving unit 8 (see FIG. 1). This makes it possible to perform a process same as that described above. FIG. 5 is a plan view schematically showing recording spots of plural interference images recorded before and after the recording medium 7 is rotated. By rotating the recording medium 7 in this way to shift the center of a recording circle (a circle formed by plural recording spots corresponding to the one rotation of the deflection unit 21), it is possible to multiply record, by shifting the optical path again, plural interference images in positions different from recording positions of the interference images recorded before the rotation of the recording medium 7. Thereafter, the recording medium 7 only has to be shifted by the disk driving unit 8 every time the optical path of the information light L1 is rotated once around the optical axis of the Fourier transform optical system 4 by the optical path shifter 20.

In the above explanation, an interference image is recorded on the recording medium 7 by rotating the deflection unit 21 of the optical path shifter 20. However, when information recorded as the interference image is reproduced, a deflection unit of an optical path shifter on a readout side only has to be rotated in the same manner to shift, every time the information is reproduced, an optical path of light reproduced by the irradiation of the reference light L2.

As described above, in this embodiment, the optical path of the information light L1 is shifted by the optical path shifter 20, every time an interference image is recorded, around the optical axis of the Fourier transform optical system 4 while shifting the optical path in the direction perpendicular to the optical axis. Thus, even in a state in which the recording medium 7 is kept stationary, it is possible to realize shift multiple recording of the interference image. Since the optical path shifter 20 is a small component compared with the recording medium 7, in realizing the shift multiple recording, external factors (e.g., warp of the recording medium) adversely affecting the recording, which are taken into account when the recording medium 7 is shifted, do not have to be taken into account. Therefore, it is possible to record the interference image in a state in which the external factors adversely affecting the recording are fundamentally eliminated. This makes it unnecessary to perform complicated control for reducing the influence of the external factors and makes it possible to stably and accurately record the interference image. Moreover, with the simple structure in which the optical path shifter 20 is provided, it is possible to multiply record the interference image on the recording medium 7 accurately.

According to the one rotation of the deflection unit 21 of the optical path shifter 20, an incidence position (an irradiation spot) of the information light L1 on the recording medium 7 is shifted in a circular shape around the optical axis of the Fourier transform optical system 4. However, as in this embodiment, if the reference light L2 made incident on the recording medium 7 is parallel light, it is easy to adjust a light beam diameter of the reference light L2 to a light beam diameter that covers an entire area of the irradiation spot of the information light L1 irradiated on the recording medium 7 while the deflection unit 21 is rotated once. Consequently, even when plural interference images are recorded on the recording medium 7 according to the rotation of the deflection unit 21, it is possible to cause all information lights corresponding to the respective interference images (all information lights L1 made incident on the recording medium 7 in every rotation at a predetermined angle of the deflection unit 21) to interfere with the reference light L2 made incident from an identical direction to record the interference images. This makes it unnecessary to change an incidence angle and an incidence position of the reference light L2 on the recording medium 7 every time the respective interference images are recorded and makes it possible to simplify the structure of the apparatus.

In this embodiment, the deflection unit 21 is rotated around the optical axis of the Fourier transform optical system 4 by the shifter driving unit 22 while the optical path of the information light L1 is translated in the direction perpendicular to the optical axis of the Fourier transform optical system 4 by the deflection unit 21. Thus, it is possible to multiply record plural interference images around the optical axis surely without shifting the recording medium 7.

In this embodiment, one prism 31b of the deflection unit 21 is arranged to be plane symmetrical to the other prism 31a with respect to the surface perpendicular to the optical axis of the Fourier transform optical system 4 when the prism 31a is rotated 180 degrees around the optical axis. Thus, it is possible to translate all rays made incident on the deflection unit 21 from the modulation element 3 through the Fourier transform optical system 4 (including rays diffracted by the respective pixels of the modulation element 3) in the same direction perpendicular to the optical axis of the Fourier transform optical system 4. Therefore, it is possible to prevent, without an increase in aberration due to optical path shift of the information light L1, deterioration in performance from occurring according to the optical path shift.

In this embodiment, the pair of prisms (the prisms 31a and 31b), which are general optical elements, are used as a pair of deflection optical elements of the deflection unit 21 of the optical path shifter 20. Thus, it is possible to manufacture the deflection unit 21 inexpensively and accurately.

The deflection optical elements constituting the deflection unit 21 are not limited to the pair of prisms. Other optical elements may constitute the deflection unit 21. Examples of such other optical elements include a diffractive optical element (DOE), an acoustic optical element deflector (AOD), and an electric optical deflector (EOD). However, it is likely that, in these optical elements, when an NA of the Fourier transform optical system 4 is large, focusing performance is extremely deteriorated, for example, spherical aberration increases. Thus, it is desirable to use the optical elements in an optical system with a small NA.

In this embodiment, the disk driving unit 8 is used as recording medium shifting means for shifting the recording medium 7 every time the optical path of the information light L1 is rotated once around the optical axis of the Fourier transform optical system 4 by the optical path shifter 20. By performing both of the shift of the recording medium 7 by the disk driving unit 8 and the shift of the optical path by the optical path shifter 20 in this way, compared with the multiple recording performed only by the shift of the recording medium 7, it is possible to realize an identical recording density with a smaller number of times of shift of the recording medium 7. Therefore, it is possible to multiply record an interference image at high density while reducing the adverse effect of a state of the recording medium 7 during rotation on the recording as much as possible.

An amount of shift of the recording medium 7 by the disk driving unit 8 may be set in any way as long as the amount of shift is an amount of shift that makes it possible to separately record and reproduce plural interference images as data, i.e., an amount of shift that prevents plural interference images from being recorded in an identical position of the recording medium 7.

Figure 6:
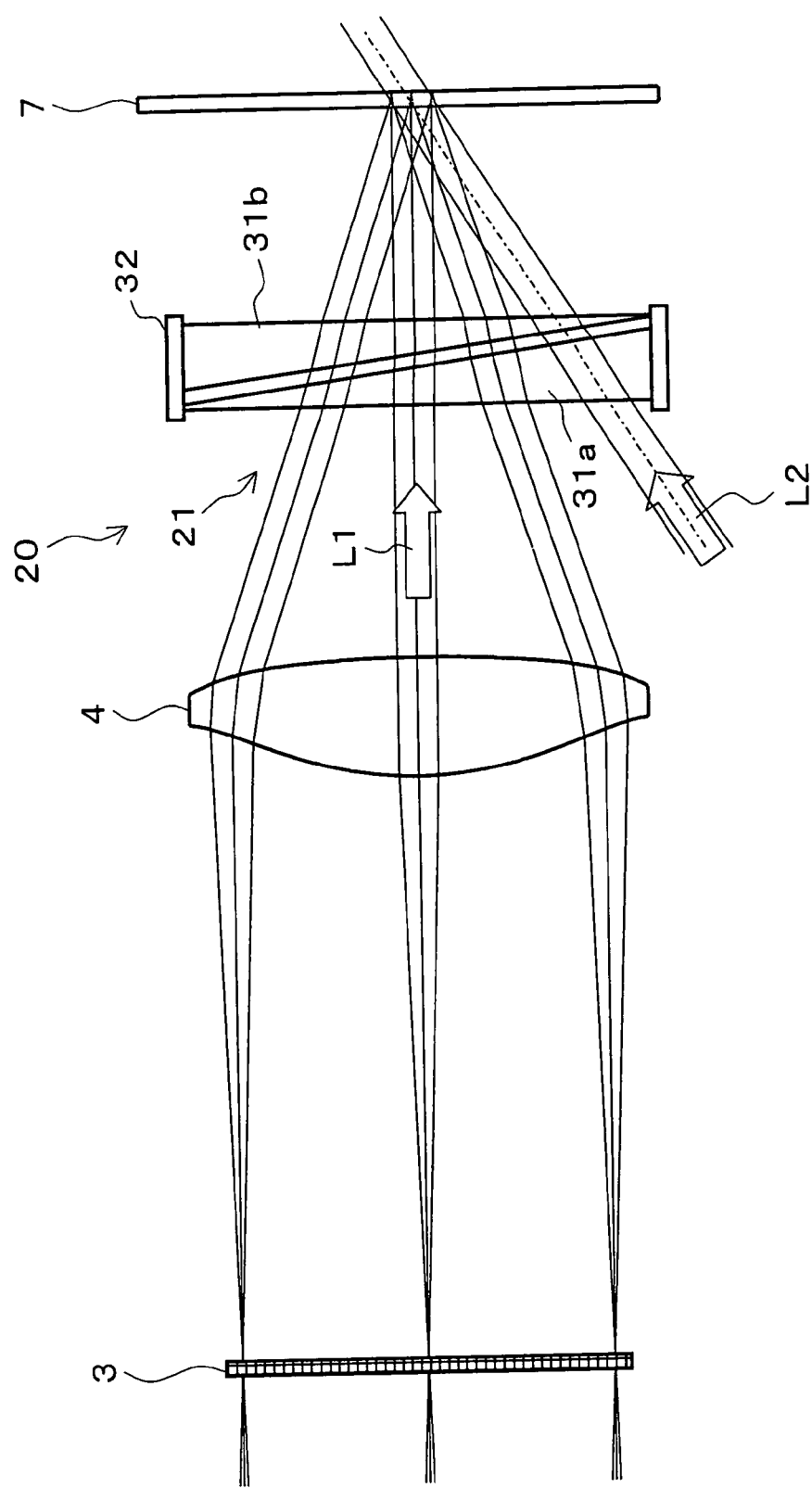
FIG. 6 is an explanatory diagram showing another example of the structure of the information recording apparatus.

FIG. 6 is an explanatory diagram showing another example of the structure of the information recording apparatus. As shown in the figure, the optical path shifter 20 may be formed in a shape and a size for arrangement not only in the optical path between the Fourier transform optical system 4 and the recording medium 7 but also in the optical path between the splitting optical system 2 (see FIG. 2) and the recording medium 7, i.e., a shape and a size for traversing both the optical path (both the optical path of the information light L1 and the optical path of the reference light L2).

By constituting and arranging the optical path shifter 20 in this way, it is possible to shift, every time an interference image is recorded, both the optical path of the information light L1, which is lead from the Fourier transform optical system 4 to the recording medium 7, and the optical path of the reference light L2, which is split by the splitting optical system 2 and led to the recording medium 7, around the optical axis of the Fourier transform optical system 4 while shifting the optical paths in the direction perpendicular to the optical axis of the Fourier transform optical system 4. Moreover, it is possible to cause the information light L1 and the reference light L2 to interfere with each other while shifting both the optical paths.

As described above, when the light beam diameter of the reference light L2 is the light beam diameter that covers the entire area of the irradiation spot of the information light L1 irradiated on the recording medium 7 during one rotation of the deflection unit 21, an incidence direction of the reference light L2 on the recording medium 7 is an identical direction in the recording of all interference images. Thus, when the reference light L2 is irradiated on the recording medium 7 during reproduction of information, it is likely that reproduced light from an interference image other than an interference image intended to be read out is generated as noise to cause a readout error. As a method of reducing this readout error, there is a method of using 3/16 modulation for displaying only three pixels in sixteen pixels of modulating means as described in, for example, the Non-Patent Document 1. It is also possible to optically cope with the readout error by providing a variable-position stop and deflecting means to set an irradiation position in a predetermined recording spot position in an optical path of reflected light during reproduction. Further, it is also possible to cope with the readout error by modulating reference light using a spatial modulation element according to a spot position during recording and applying the same modulation to the reference light during reproduction.

On the other hand, in the structure of the information recording apparatus shown in FIG. 6, an incidence position of the reference light L2 on the recording medium 7 is different for each recording of the interference image. Thus, when the reference light L2 is irradiated on the recording medium 7 during reproduction of information, it is possible to reproduce only information of an interference image intended to be read out (an interference image recorded by interference of the reference light L2, which is made incident from a direction same as a direction of the reference light L2 during reproduction, and the information light L1). As a result, it is possible to prevent the readout error without taking the measures described above.

In the explanation of this embodiment, the transmission spatial phase modulator is used as the modulation element 3. However, it is also possible to use a reflection spatial phase modulator (e.g., reflection liquid crystal display element and a DMD (Digital Micromirror Device; manufactured by Texas Instruments Incorporated in the United States)).

When a pitch of pixels of the modulation element 3 is small, a diffractive angle of light diffracted by the pixels is large. Thus, a recording spot diameter of an interference image recorded on the recording medium 7 is large. On the other hand, in order to record information on the recording medium 7 at high density, it is necessary to set the recording spot diameter of the interference image small. However, in order to set the recording spot diameter small, it is necessary to set the pixel pitch of the modulation element 3 large. Therefore, it is necessary to set the pixel pitch (the number of pixels) of the modulation element 3 and the recording density of the recording medium 7 taking into account a balance between the pixel pitch and the recording density.

Second Embodiment

Another embodiment of the present invention is explained with reference to the drawings as follows. For convenience of explanation below, components identical with those in the first embodiment are denoted by the identical reference numerals and signs and explanations of the components are omitted.

Figure 7:
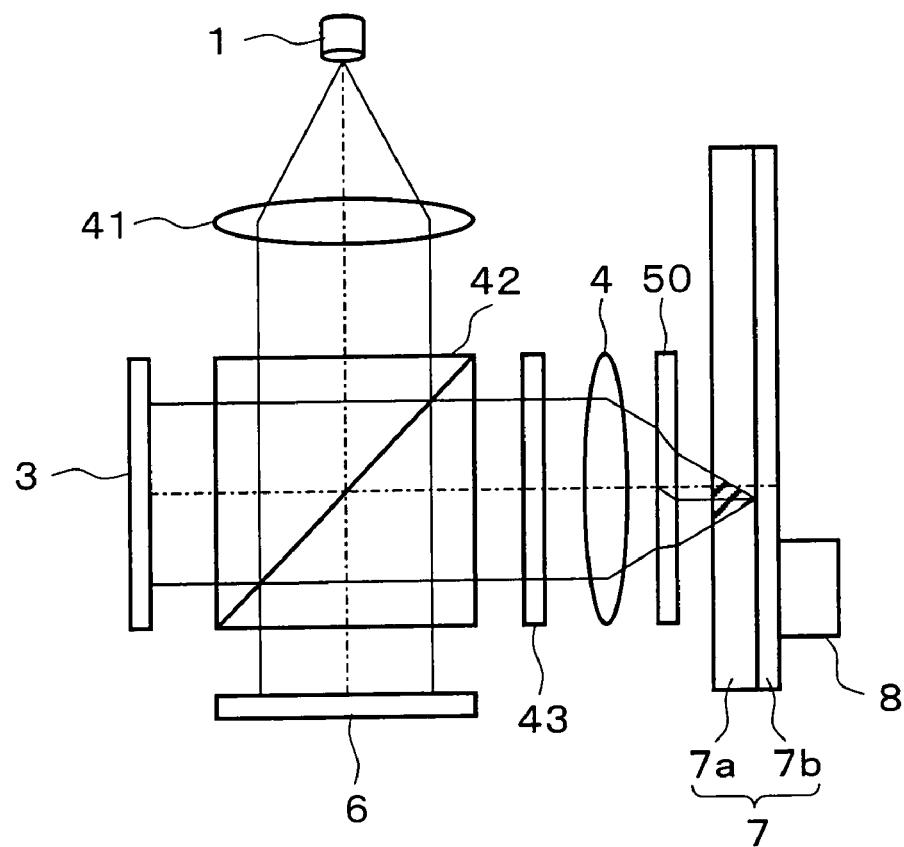
FIG. 7 is an explanatory diagram showing an overall structure of an information recording apparatus according to another embodiment of the invention.

FIG. 7 is an explanatory diagram showing an overall structure of an information recording medium according to this embodiment. This information recording apparatus includes the light source 1, an illuminating optical system 41, a polarization splitting element (PBS) 42, the modulation element 3, a quarter wave plate 43, the Fourier transform optical system 4, an optical path shifter 50, the readout unit 6, and the disk driving unit 8. In this embodiment, the light source 1 emits S polarized light and the readout unit 6 is arranged in a position optically conjugate with the modulation element 3. The recording medium 7 is a reflection recording medium in which a reflection layer 7b is provided below a recording layer 7a.

The illuminating optical system 41 includes a collimator lens that converts light emitted from the light source 1 into parallel light and emits the parallel light. The PBS 42 is a polarization splitting element that transmits or reflects incident light according to a polarization state of the incident light. In this embodiment, the PBS 42 transmits P polarized light and reflects S polarized light. The PBS 42 is arranged in an optical path of light traveling from the light source 1 to the modulation element 3 and an optical path of light traveling from the modulation element 3 to the Fourier transform optical system 4.

The modulation element 3 modulates a part of the light emitted from the light source 1, emits the modulated light as information light having information that should be recorded on the recording medium 7, and emits the remainder of the light as reference light. In this embodiment, the modulation element 3 is a reflection optical modulation element (e.g., a reflection LCD or DMD) having plural pixels in a matrix shape. Therefore, the modulation element 3 is capable of two-dimensionally displaying, as page data, information that should be recorded on the recording medium 7 and emitting light including information of the page data as information light. The reflection optical modulation element has a high aperture ratio and is obtained at low cost compared with the transmission optical modulation element. Therefore, by constituting the modulation element 3 in the reflection type, it is possible to improve efficiency of use of light and constitute the modulation element 3 at low cost.

Figure 8:
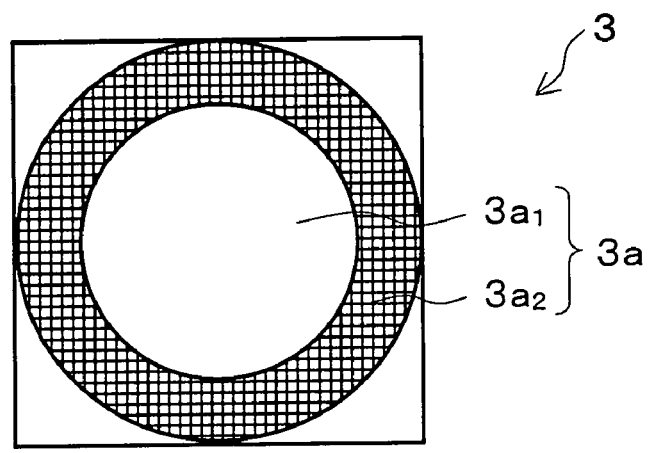
FIG. 8 is a plan view showing an example of division of a light incidence area of a modulation element included in the information recording apparatus.

FIG. 8 is a plan view showing a light incidence area 3a of the modulation element 3. As shown in the figure, the light incidence area 3a is divided into a first incidence area $3a_1$ and a second incidence area $3a_2$. A part of light emitted from the light source 1 is made incident on the first incidence area $3a_1$ and the remainder of the light is made incident on the second incidence area $3a_2$. Therefore, information light is emitted from the first incidence area $3a_1$ and reference light is emitted from the second incidence area $3a_2$. In this embodiment, the first incidence area $3a_1$ and the second incidence area $3a_2$ are divided in a concentric circle shape. The first incidence area $3a_1$ is located on an inner side and the second incidence area $3a_2$ is located on an outer side of the first incidence area $3a_1$.

The modulation element 3 may modulate the light made incident on the second incidence area $3a_2$ and emit the modulated light as reference light. When information recorded on the recording medium 7 is reproduced, it is necessary to irradiate reference light identical with reference light used during recording on the recording medium 7. Thus, when modulated reference light is used during recording, it is necessary to also use modulated reference light during reproduction. This makes it impossible to reproduce the information recorded on the recording medium 7 by irradiating other reference light. In other words, when the modulated reference light is used during recording as described above, it is possible to improve security of the information recorded on the recording medium 7 and prevent the information recorded on the recording medium 7 from being easily reproduced during reproduction. Therefore, it can be said that the modulation element 3 only has to modulate, when necessary, the light made incident on the second incidence area $3a_2$ in the light emitted from the light source 1.

The quarter wave plate 43 converts linear polarized light (e.g., P polarized light) made incident thereon from the modulation element 3 through the PBS 42 into circular polarized light and, on the other hand, converts circular polarized light made incident thereon from the recording medium 7 through the Fourier transform optical system 4 into linear polarized light (e.g., S polarized light), a polarization direction of which is orthogonal to that of the linear polarized light described above.

As in the first embodiment, the optical path shifter 50 shifts, every time an interference image is recorded, an optical path of the light, which is led from the Fourier transform optical system 4 to the recording medium 7, around the optical axis of the Fourier transform optical system 4 while shifting the optical path in a direction perpendicular to the optical axis. Details of the optical path shifter 50 are described later.

In the information recording apparatus having the structure described above, light (e.g., S polarized light) emitted from the light source 1 is converted into parallel light by the illuminating optical system 41, and reflected by the PBS 42 to be made incident on the modulation element 3. In the modulation element 3, light made incident on the first incidence area $3a_1$ is modulated and emitted as information light. On the other hand, light made incident on the second incidence area $3a_2$ is directly reflected and emitted as reference light. The information light and the reference light (both of which are P polarized light) emitted from the modulation element 3 are made incident on the PBS 42, transmitted through the PBS 42, converted into circular polarized light by the quarter wave plate 43, subjected to Fourier transform by the Fourier transform optical system 4, and then irradiated and condensed on the recording layer 7a of the recording medium 7 through the optical path shifter 50. In the recording layer 7a of the recording medium 7, the information light and the reference light irradiated on the recording layer 7a interfere with each other, whereby an interference image is recorded.

During reproduction of information, light (e.g., S polarized light) emitted from the light source 1 is converted into parallel light by the illuminating optical system 41, and reflected by the PBS 42 to be made incident on the modulation element 3. Light made incident on the first incidence area $3a_1$ of the modulation element 3 is not modulated by the modulation element 3 and is not emitted in the direction of the PBS 42. On the other hand, light made incident on the second incidence area $3a_2$ of the modulation element 3 is directly reflected and emitted as reference light. This reflected light is light identical with that during recording. The reference light (P polarized light) emitted from the modulation element 3 is made incident on the PBS 42 and transmitted through the PBS 42, converted into circular polarized light by the quarter wave plate 43, and irradiated and condensed on the recording layer 7a of the recording medium 7 through the Fourier transform optical system 4 and the optical path shifter 50. Light having information recorded as the interference image is reproduced from the recording layer 7a of the recording medium 7.

The reproduced light obtained from the recording medium 7 is made incident on the Fourier transform optical system 4 through the optical path shifter 50 again, subjected to inverse Fourier transform by the Fourier transform optical system 4, converted into S polarized light, a polarization direction of which is orthogonal to that during irradiation on the recording medium 7, by the quarter wave plate 43, and reflected by the PBS 42 to be made incident on the readout unit 6. In the readout unit 6, when the reproduced light from the recording medium 7 is received on the readout surface, the information recorded as the interference image on the recording medium 7 is read out.

In this embodiment, the modulation element 3 is capable of modulating a part of light emitted from the light source 1 according to retrieved information and emitting the light. When the light modulated by the modulation element 3 according to the retrieved information is irradiated on the recording medium 7 through the Fourier transform optical system 4, the readout unit 6 receives, on the readout surface, reproduced light from the recording medium 7 including a result of calculation of a correlation between a Fourier image of the light and the interference image of the recording medium 7. Therefore, it is possible to judge (find), on the basis of the result of calculation of the correlation, whether desired information is recorded on the recording medium 7.

Figure 9:
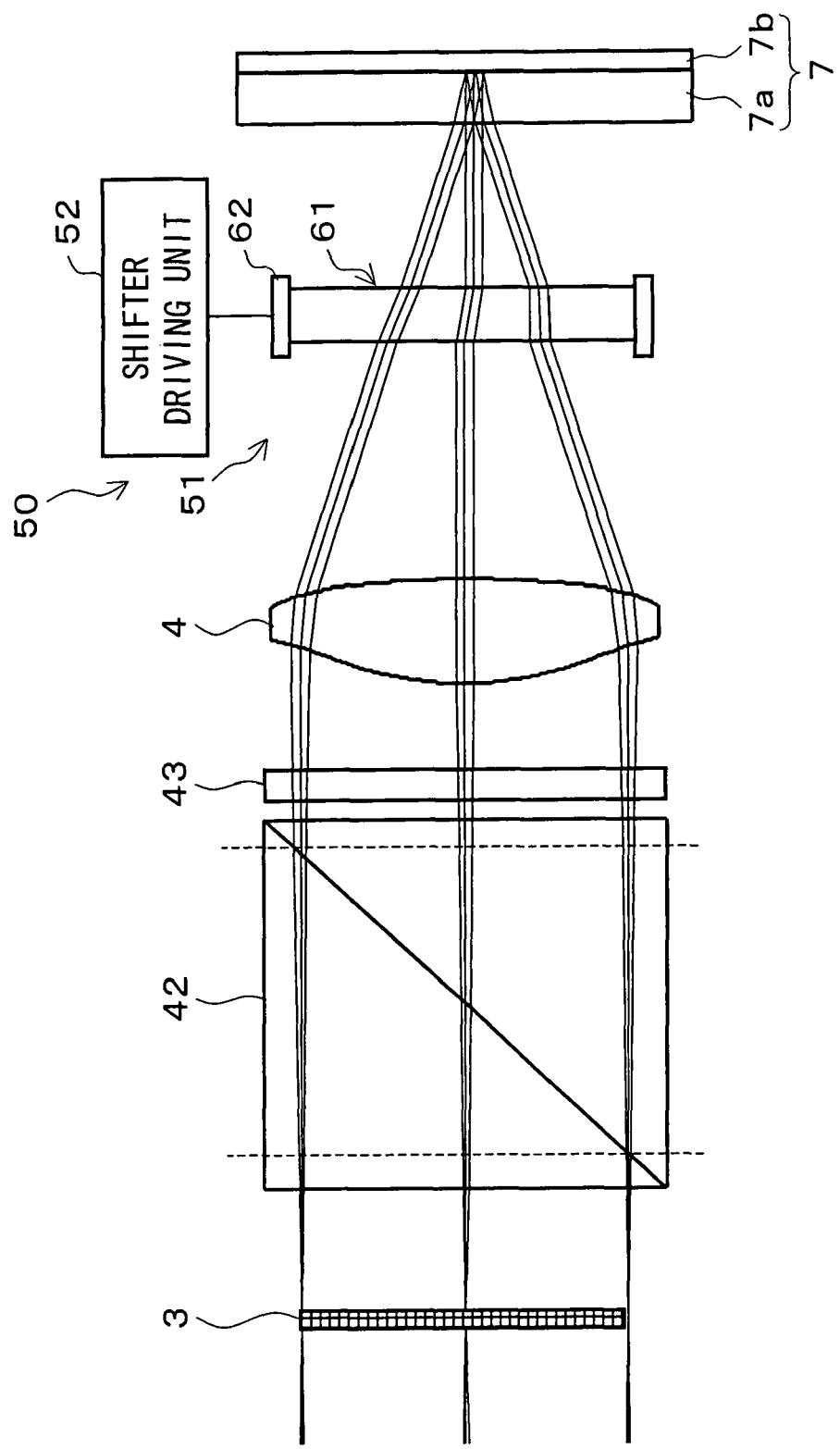
FIG. 9 is an explanatory diagram schematically showing a structure of a main part of the information recording apparatus.
Figure 10:
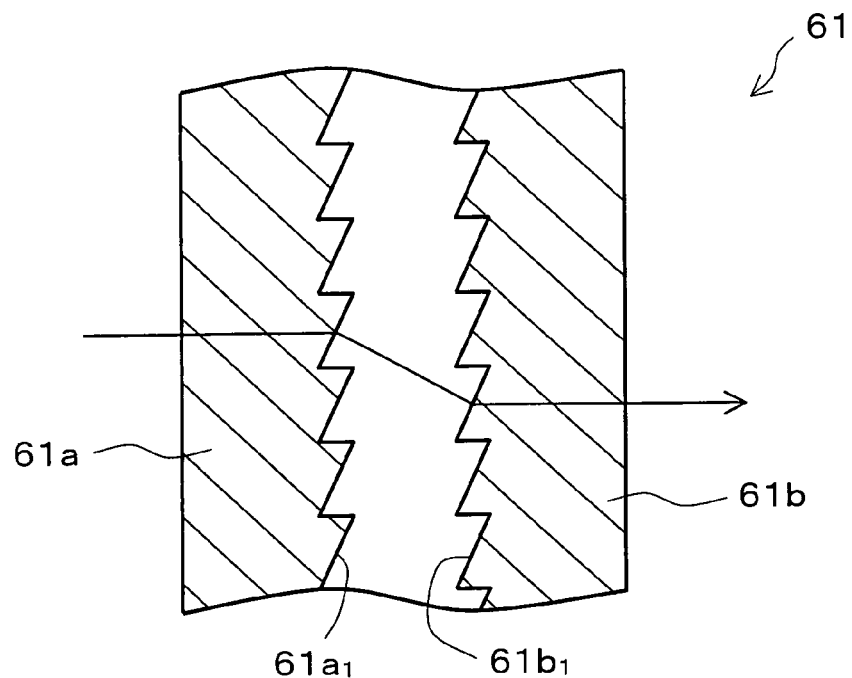
FIG. 10 is a sectional view showing a schematic structure of a deflection optical element of an optical path shifter included in the information recording apparatus.

The optical path shifter 50 according to this embodiment is explained. FIG. 9 is an explanatory diagram schematically showing a structure of a main part of the information recording apparatus according to this embodiment. FIG. 10 is a sectional view showing a schematic structure of a deflection optical element 61 described later of the optical path shifter 50.

The optical path shifter 50 includes a deflection unit 51 and a shifter driving unit 52. The Shifter driving unit 52 is, like the shifter driving unit 22 according to the first embodiment, driving means for rotating the deflection unit 51 around the optical axis of the Fourier transform optical system 4 every time an interference image is recorded.

The deflection unit 51 is deflecting means for translating an optical path of the light, which is led from the Fourier transform optical system 4 to the recording medium 7, in a direction perpendicular to the optical axis of the Fourier transform optical system 4. In this embodiment, the deflection unit 51 includes a pair of DOEs 61a and 61b serving as the deflection optical element 61 and a holding frame 62.

Both the DOEs 61a and 61b are diffractive optical elements, on one surfaces of which blazes are formed. The DOEs 61a and 61b are formed in an identical shape and arranged such that surfaces $61a_1$ and $61b_1$, on which the blazes are formed, are opposed to each other via a void. The DOE 61b is arranged to be plane symmetrical to the DOE 61a with respect to a surface perpendicular to the optical axis of the Fourier transform optical system 4 when the DOE 61a is rotated 180 degrees around the optical axis. The blazes formed on the surfaces $61a_1$ and $61b_1$ may be equal when an NA of the Fourier transform optical system 4 is small. However, when the NA is large, the blazes need to be formed to prevent optical aberration from becoming large.

The holding frame 62 is a frame that holds the DOEs 61a and 61b and formed around the optical axis of the Fourier transform optical system 4. Therefore, the DOEs 61a and 61b are located further on an inner side (the optical axis side) than the holding frame 62.

By constituting the optical path shifter 50 in this way, lights (information light and reflection light) from the Fourier transform optical system 4 are diffracted in one direction by the DOEs 61a and 61b of the deflection unit 51. As a result, optical paths of the lights are shifted in parallel in a direction perpendicular to the optical axis of the Fourier transform optical system 4. Therefore, by rotating the deflection unit 51 with the optical axis of the Fourier transform optical system 4 as a rotation axis using the shifter driving unit 52 every time an interference image is recorded, it is possible to shift a recording position of the interference image around the optical axis.

As described above, in this embodiment, as in the first embodiment, an optical path of light emitted from the Fourier transform optical system 4 is shifted, every time an interference image is recorded, around the optical axis of the Fourier transform optical system 4 by the optical path shifter 50 while being shifted in a direction perpendicular to the optical axis of the Fourier transform optical system 4. This makes it possible to multiply record the interference image in a state in which the recording medium 7 is kept stationary. As in the first embodiment, this makes it unnecessary to perform complicated control and makes it possible to multiply record the interference image on the recording medium 7 accurately with a simple structure.

The light incidence area 3a of the modulation element 3 is divided into the first incidence area $3a_1$ and the second incidence area $3a_2$. By dividing one light incidence area 3a into an incidence area for information light generation (the first incidence area $3a_1$) and an incidence area for reference light generation (the second incidence area $3a_2$) and using the incidence areas in this way, it is possible to coaxially lead information light and reference light emitted from the modulation element 3 to the recording medium 7. Therefore, it is possible to constitute the apparatus in a small size compared with the apparatus in which the information light and the reference light are led to the recording medium 7 in a state in which optical paths of the information light and the reference light are apart from each other.

In this embodiment, the deflection optical element 61 of the deflection unit 51 includes the pair of DOEs 61a and 61b.

Thus, it is possible to easily reduce the thickness of the deflection unit 51 and constitute the deflection unit 51 itself in a small size.

During reproduction of information, the optical path between the Fourier transform optical system 4 and the recording medium 7 is translated in the direction perpendicular to the optical axis of the Fourier transform optical system 4 by the deflection unit 51 of the optical path shifter 50. The deflection unit 51 is rotated around the optical axis of the Fourier transform optical system 4 by the shifter driving unit 52 every time information is reproduced. Then, it is possible to shift, every time information is reproduced, the optical path between the Fourier transform optical system 4 and the recording medium 7 around the optical axis of the Fourier transform optical system 4 while shifting the optical path in the direction perpendicular to the optical axis of the Fourier transform optical system 4. Therefore, even when an interference image is multiply recorded on the recording medium 7 as in this embodiment, it is possible to accurately reproduce information included in the interference image using the optical path shifter 50.

When the recording medium 7 is the transmission type, reference light from the modulation element 3 is led to the recording medium 7 through a Fourier transform optical system (e.g., the Fourier transform optical system 4) and the optical path shifter 50. Reproduced light from the recording medium 7 is led to the readout unit 6 through an optical path shifter equivalent to the optical path shifter 50 and an inverse Fourier transform optical system (e.g., the Fourier transform optical system 5 in FIG. 2). Therefore, when the information recording apparatus according to this embodiment is considered as an apparatus only for reproduction of information (an information reproducing apparatus), the information reproducing apparatus according to this embodiment can be represented as follows regardless of whether the recording medium 7 is the reflection type or the transmission type.

The information reproducing apparatus includes the light source 1 that emits coherent light, a reference-light irradiation optical system that leads a part of the light emitted from the light source 1 to the recording medium 7 as reference light, an inverse Fourier transform optical system (the Fourier transform optical system 4 for the recording medium 7 of the reflection type or the Fourier transform optical system 5 for the recording medium 7 of the transmission type) that subjects light reproduced from the recording medium 7 when the reference light is irradiated on the recording medium 7 to inverse Fourier transform, the readout unit 6 that receives the reproduced light through the inverse Fourier transform optical system and reads out information recorded as an interference image, and an optical path shifter (the optical path shifter 50 for the recording medium 7 of the reflection type or the optical path shifter equivalent to the optical path shifter 50 for the recording medium 7 of the transmission type) that shifts, every time information is reproduced, an optical path between the recording medium 7 and the inverse Fourier transform optical system around an optical axis of the inverse Fourier transform optical system while shifting the optical path in a direction perpendicular to the optical axis.

The reference-light irradiation optical system includes the modulation element 3 that modulates a part of the light emitted from the light source 1 when necessary and emits the part of the light as reference light and the Fourier transform optical system 4 that leads the reference light emitted from the modulation element 3 to the recording medium 7. The inverse Fourier transform optical system subjects light reproduced from the recording medium 7 when the reference light is irradiated on the recording medium 7 through the Fourier transform optical system 4 to inverse Fourier transform. The reference-light irradiation optical system may include the splitting optical system 2 in FIG. 2 (in particular, the optical elements arranged in an optical path of the reference light such as the half mirror 11 and the collimator lens 13) that splits the light emitted from the light source 1 into two light beams and leads one of the light beams to the recording medium 7 as the reference light.

The optical path shifter includes the deflection unit 51 that translates the optical path between the recording medium 7 and the inverse Fourier transform optical system in the direction perpendicular to the optical axis of the inverse Fourier transform optical system and the shifter driving unit 52 that rotates the deflection unit 51 around the optical axis of the inverse Fourier transform optical system every time information is reproduced.

Figure 11:
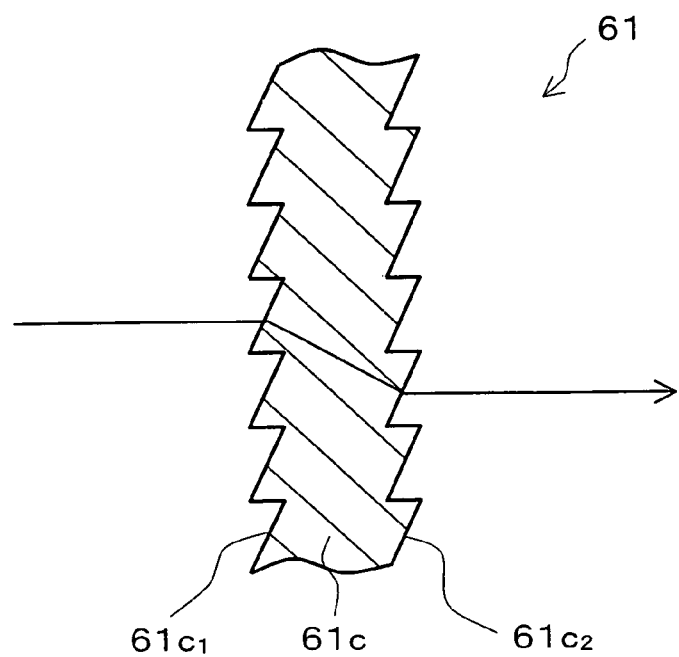
FIG. 11 is a sectional view showing another example of the structure of the deflection optical element.

FIG. 11 is a sectional view showing another example of the structure of the deflection optical element 61. As shown in the figure, the deflection optical element 61 may include one DOE 61$c$ of a both-side blaze type. The DOE 61$c$ is a diffractive optical element in which blazes are formed on a surface 61$c_1$ on a light incidence side thereof and on a surface 61$c_2$ on a light emission side thereof, respectively. In the DOE 61$c$, the surface 61$c_2$ on the light emission side is arranged to be plane symmetrical to the surface 61$c_1$ on the light incidence side with respect to a surface perpendicular to the optical axis when the surface 61$c_1$ on the light incidence side is rotated 180 degrees around the optical axis of the Fourier transform optical system 4.

In this way, even when the deflection optical element 61 includes one DOE 61$c$, it is possible to translate all rays made incident on the DOE 61$c$ from the modulation element 3 through the Fourier transform optical system 4 in the same direction perpendicular to the optical axis of the Fourier transform optical system 4. Therefore, there is no increase in aberration due to optical path shift and deterioration in performance due to the optical path shift does not occur. Since it is possible to obtain the above-mentioned effect by using one DOE 61$c$, it is possible to simplify the structure of the deflection unit 51.

Figure 12:
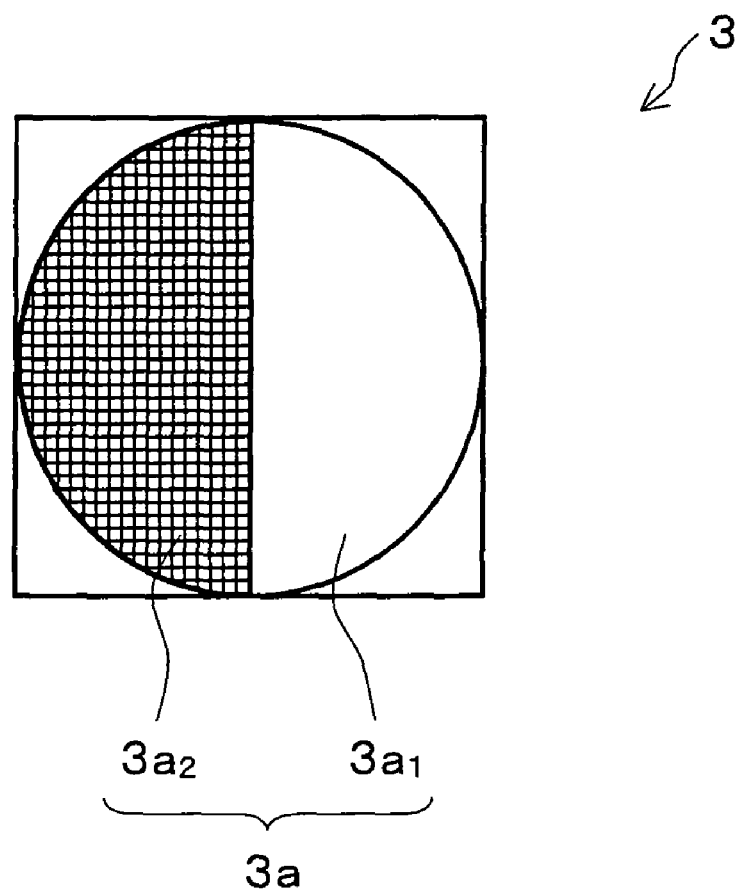
FIG. 12 is a plan view showing another example of the division of the light incidence area of the modulation element.
Figure 13:
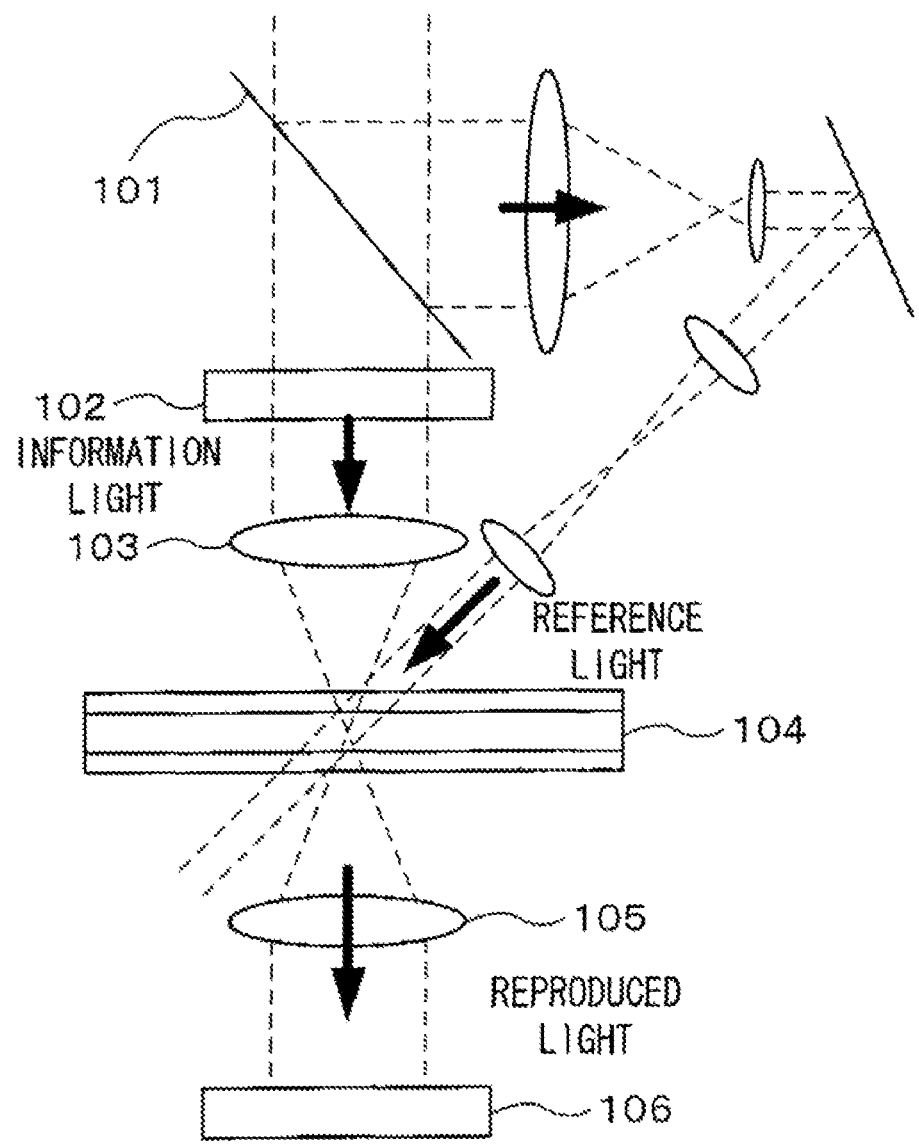
FIG. 13 is an explanatory diagram schematically showing a structure of a main part of a conventional information recording apparatus.
Figure 14A:
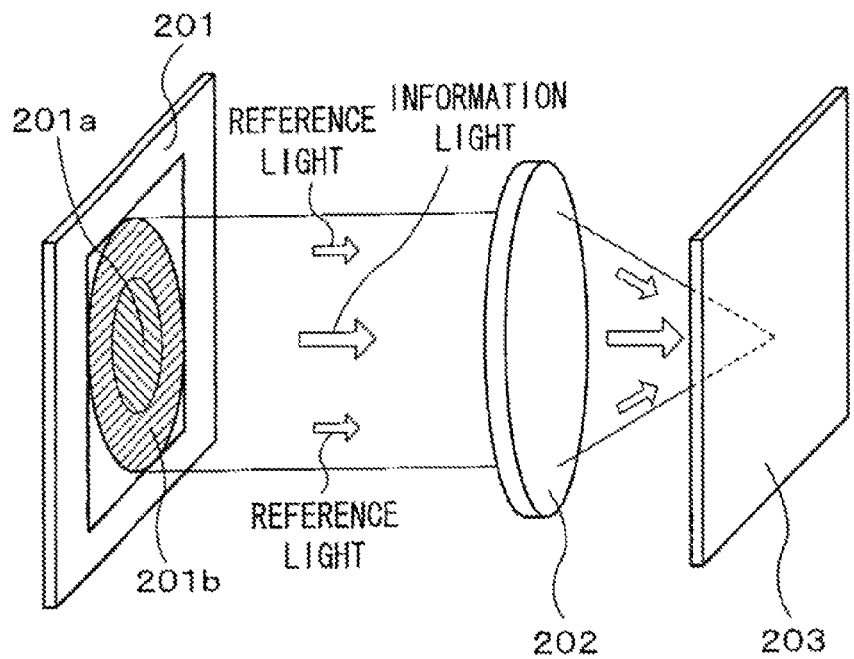
FIGS. 14A and 14B are perspective views schematically showing a structure of a main part of another conventional information recording apparatus.
Figure 14B:
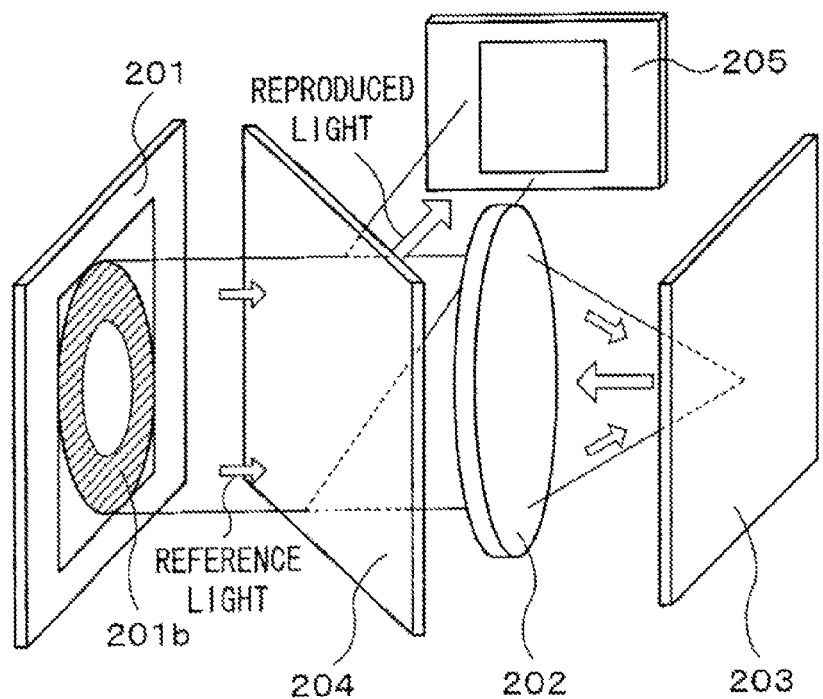
Figure 15:
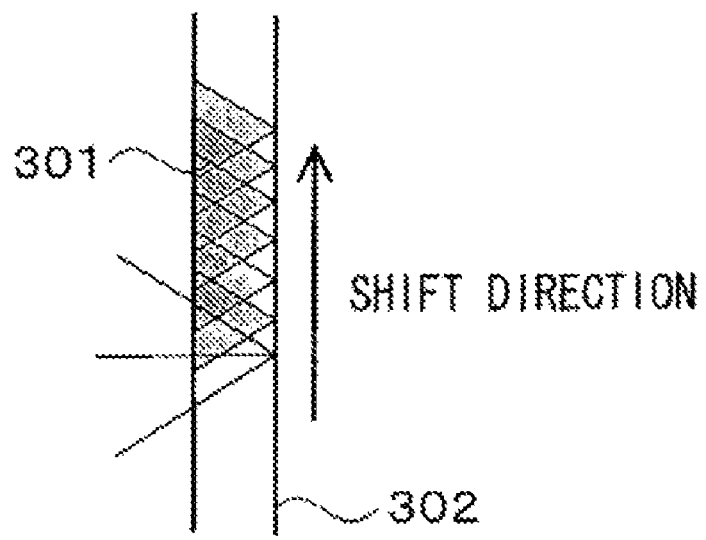
FIG. 15 is a sectional view schematically showing a state in which an interference image is multiply recorded by shifting a recording medium.
Figure 16:
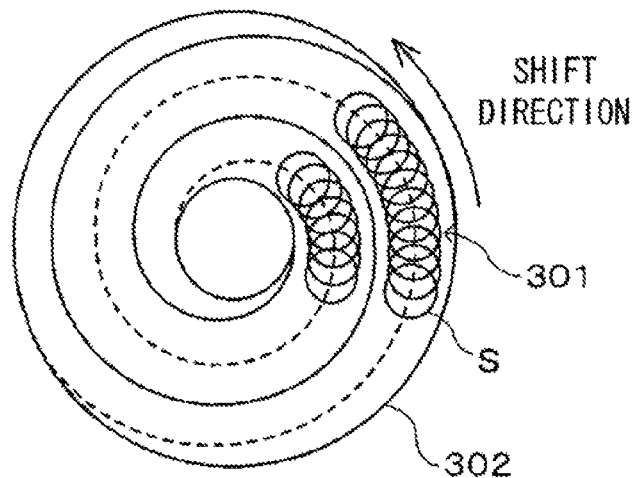
FIG. 16 is a plan view of a recording medium on which the interference image is multiply recorded by shifting the recording medium such that recording spots are arranged in a spiral shape.
Figure 17:
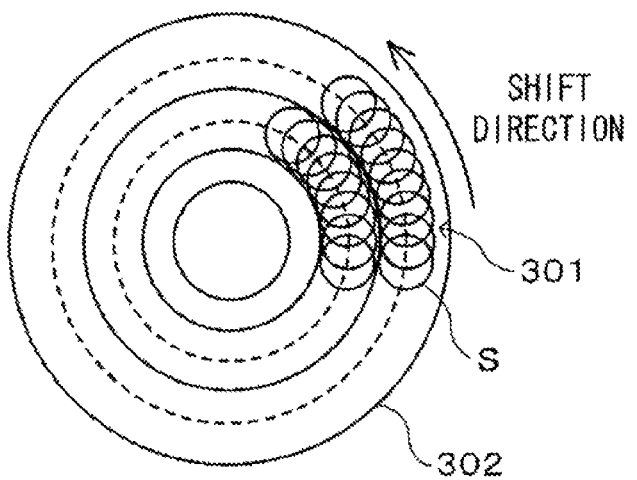
FIG. 17 is a plan view of a recording medium on which the interference image is multiply recorded by shifting the recording medium such that the recording spots are arranged in a concentric circle shape.

In this embodiment, the first incidence area 3$a_1$ and the second incidence area 3$a_2$ of the modulation element 3 are formed in a concentric circle shape. However, the first incidence area 3$a_1$ and the second incidence area 3$a_2$ may be formed in other shapes. For example, as shown in FIG. 12, one area of a semicircular shape formed by dividing the circular light incidence area 3$a$ of the modulation element 3$a$ into two with a surface including the optical axis of the Fourier transform optical system 4 may be set as the first incidence area 3$a_1$ and the other area of a semicircular shape may be set as the second incidence area 3$a_2$.

When the first incidence area 3$a_1$ and the second incidence area 3$a_2$ are formed in a shape symmetrical with respect to the surface including the optical axis of the Fourier transform optical system 4 in this way, information light emitted from the first incidence area 3$a_1$ and reference light emitted from the second incidence area 3$a_2$ of the modulation element 3 are led to the recording medium 7 on optical paths adjacent to each other. Thus, it is possible to constitute the apparatus in a small size.

In this embodiment, the reflection modulation element is used as the modulation element 3 and the reflection recording medium is used as the recording medium 7. However, naturally, it is also possible to apply the invention when the modulation element 3 and the recording medium 7 are the transmission type.

Naturally, it is also possible to constitute an information recording apparatus by appropriately combining the structures explained in the respective embodiments.

The information recording apparatus according to the invention can also be represented as follows. Specific operational effect described below is realized by the information recording apparatus.

The information recording apparatus according to the invention may include a light source that emits coherent light, modulating means for modulating incident light and emitting modulated light as information light having information that should be recorded on a recording medium, a splitting optical system that splits the light emitted from the light source into two light beams, leads one of the light beams to the modulating means, and leads the other to the recording medium as reference light, and a Fourier transform optical system that leads the light emitted from the modulating means to the recording medium, the information recording apparatus causing the information light and the reference light to interfere with each other to record an interference image on the recording medium, wherein the information recording apparatus includes optical path shifting means for shifting, every time an interference image is recorded, an optical path of the light, which is led from the Fourier transform optical system to the recording medium, around an optical axis of the Fourier transform optical system while shifting the optical path in a direction perpendicular to the optical axis.

In the information recording apparatus having the structure described above, the light emitted from the light source is split into two light beams by the splitting optical system, one of the light beams is led to the modulating means, and the other light beam is led to the recording medium as reference light. Light modulated by the modulating means is emitted as information light and led to the recording medium through the Fourier transform optical system. An interference image (an interference fringe) is recorded on the recording medium by interference of the information light and the reference light.

The optical path of the light emitted from the Fourier transform optical system is shifted, every time an interference image is recorded, around the optical axis of the Fourier transform optical system by the optical path shifting means while being shifted in the direction perpendicular to the optical axis of the Fourier transform optical system. This makes it possible to realize shift multiple recording of an interference image without shifting the recording medium. For example, if the optical path is shifted by one degree around the optical axis of the Fourier transform optical system every time an interference image is recorded, it is possible to multiply record 360 interference images around the optical axis.

When the recording medium is shifted, external factors such as warp of the recording medium (a state of the recording medium) substantially affects recording of an interference image. However, according to the invention, it is possible to multiply record an interference image according to optical path shift by the optical path shift means in a state in which the recording medium is kept stationary. Thus, it is possible to record the interference image in a state in which the external factors affecting recording are fundamentally eliminated. This makes it unnecessary to perform complicated control for reducing the influence of the external factors and makes it possible to multiply record the interference image on the recording medium accurately with the simple structure in which the optical path shifting means is provided.

It is desirable that the reference light made incident on the recording medium is parallel light. In this case, in recording plural interference images on the recording medium, it is possible to cause all information lights corresponding to the respective interference images to interfere with the reference light made incident to an identical direction to record the interference images. Thus, the structure of the apparatus is simplified.

The information recording apparatus according to the invention may include a light source that emits coherent light, modulating means for modulating a part of the light emitted from the light source to emit modulated light as information light having information that should be recorded on a recording medium and modulating the remainder of the light when necessary to emit the remainder of the light either modulated or intact as reference light, and a Fourier transform optical system that leads the light emitted from the modulating means to the recording medium, the information recording apparatus causing the information light and the reference light to interfere with each other to record an interference image on the recording medium, wherein the information recording apparatus includes optical path shifting means for shifting, every time an interference image is recorded, an optical path of the light, which is led from the Fourier transform optical system to the recording medium, around an optical axis of the Fourier transform optical system while shifting the optical path in a direction perpendicular to the optical axis.

In the information recording apparatus having the structure described above, a part of the light emitted from the light source is modulated by the modulating means and emitted as information light. On the other hand, the remainder of the light is modulated by the modulating means when necessary and emitted as reference light. The lights (the information light and the reference light) emitted from the modulating means are led to the recording medium through the Fourier transform optical system and an interference image is recorded by interference of the information light and the reference light.

The optical path of the light emitted from the Fourier transform optical system is shifted, every time an interference image is recorded, around the optical axis of the Fourier transform optical system by the optical path shifting means while being shifted in the direction perpendicular to the optical axis of the Fourier transform optical system. This makes it possible to multiply record the interference image in a state in which the recording medium is kept stationary. When the recording medium is shifted, external factors such as warp of the recording medium (a state of the recording medium) substantially affects recording of the interference image. However, according to the invention, it is possible to record the interference image in a state in which such external factors are fundamentally eliminated. This makes it unnecessary to perform complicated control for reducing the influence of the external factors and makes it possible to multiply record the interference image on the recording medium accurately with the simple structure in which the optical path shifting means is provided.

In the information recording apparatus having the structure described above, a light incidence area of the modulating means may be divided into a first incidence area on which a part of the light emitted from the light source is made incident and a second incidence area on which the remainder of the light is made incident.

In the information recording apparatus, a part of the light emitted from the light source is made incident on the first incidence area of the modulating means, modulated by the modulating means, and emitted as information light. On the other hand, the remainder of the light is made incident on the second incidence area of the modulating means, modulated by the modulating means when necessary, and emitted as reference light. The first incidence area and the second incidence area may be formed in a concentric circle shape or may be formed in a shape symmetrical with respect to a surface including the optical axis of the Fourier transform optical system.

In this way, the light incidence area of one modulating means is divided into an area for information light generation (the first incidence area) and an area for reference light generation (the second incidence area) and used. Thus, the information light and the reference light emitted from the modulating means are led to the recording medium on coaxial optical paths or optical paths adjacent to each other. Therefore, it is possible to constitute the apparatus in a small size compared with the apparatus in which the information light and the reference light are led to the recording medium in a state in which optical paths of the information light and the reference light are apart from each other.

In the invention, the optical path shifting means may include deflecting means for translating the optical path of the light, which is led from the Fourier transform optical system to the recording medium, in the direction perpendicular to the optical axis of the Fourier transform optical system and driving means for rotating the deflecting means around the optical axis of the Fourier transform optical system every time an interference image is recorded.

In the optical path shifting means having this structure, by rotating the deflecting means around the optical axis with the driving means while translating the optical path with the deflecting means, it is possible to multiply record plural interference images around the optical axis without shifting the recording medium.

In this case, the deflecting means may have a pair of deflection optical elements arranged to be opposed to each other via a void. One deflection optical element may be arranged to be plane symmetrical to the other deflection optical element with respect to a surface perpendicular to the optical axis when the other deflection optical element is rotated 180 degrees around the optical axis of the Fourier transform optical system.

By arranging the pair of deflection optical elements constituting the deflecting means as described above, it is possible to translate all rays made incident on the deflecting means from the modulating means through the Fourier transform optical system (including rays diffracted by respective pixels of the modulating means) in the same direction perpendicular to the optical axis of the Fourier transform optical system. Therefore, there is no increase in aberration due to optical path shift and deterioration in performance due to the optical path shift does not occur.

The pair of deflection optical elements may include prisms, respectively. In this case, it is possible to accurately constitute the deflecting means using general optical elements, i.e., the prisms. The pair of deflection optical elements may include diffractive optical elements, respectively. In this case, it is possible to reduce the thickness of the deflecting means.

The deflecting means has a diffractive optical element in which blazes are formed on a surface on a light incidence side thereof and a surface on a light emission side thereof, respectively. The surface on the light emission side of the diffractive optical element may be arranged to be plane symmetrical to the surface on the light incidence side with respect to the surface perpendicular to the optical axis when the surface on the light incidence side is rotated 180 degrees around the optical axis of the Fourier transform optical system.

The diffractive optical element of the deflecting means is a both-side blaze type. However, by defining a positional relation between the surface on the light incidence side and the surface on the light emission side as described above, it is possible to translate all rays made incident on the deflecting means from the modulating means through the Fourier transform optical system (including rays diffracted by the respective pixels of the modulating means) in the same direction perpendicular to the optical axis of the Fourier transform optical system. Therefore, there is no increase in aberration due to optical path shift and deterioration in performance due to the optical path shift does not occur. It is possible to obtain the effect described above with one diffractive optical element and simplify the structure of the deflecting means.

In the invention, the information recording apparatus may further include recording medium shifting means for shifting the recording medium every time the optical path of the light led from the Fourier transform optical system to the recording medium is rotated once around the optical axis of the Fourier transform optical system by the optical path shifting means.

In the information recording apparatus having this structure, an interference image is multiply recorded by using both the optical path shift by the optical path shifting means and the shift of the recording medium by the recording medium shifting means. Thus, compared with multiple recording performed by only the shift of the recording medium, the number of times of shift of the recording medium in realizing identical recording density (a number of times of recording of an identical interference image) is remarkably reduced. Therefore, in realizing high density recording, it is possible to record the interference image while reducing the influence of the recording medium during rotation as much as possible.

It is obvious from the above explanation that various modifications and alterations of the invention are possible. Thus, it should be understood that the invention is carried out within the scope of the appended claims without being limited by the specific description.

What is claimed is:

1. An information recording apparatus that causes information light and reference light to interfere with each other and records an interference image on a recording medium, the information recording apparatus comprising:

A fixed light source that emits coherent light;

a modulation element that modulates incident light to emit modulated light as information light having information that should be recorded on the recording medium;

a splitting optical system that splits the light emitted from the light source into two light beams, leads one of the light beams to the modulation element, and leads the other to the recording medium as reference light;

a Fourier transform optical system that leads the light emitted from the modulation element to the recording medium; and an optical path shifter located between the Fourier transform optical system and the recording medium and having an optical device configured to move relatively with respect to the fixed light source so as to move a recording spot in a circular shape around an optical axis of the Fourier transform optical system when the interference image is recorded.

2. An information recording apparatus according to claim 1, wherein the reference light made incident on the recording medium is parallel light.

3. An information recording apparatus according to claim 1, wherein the optical path shifter is arranged to traverse both an optical path of the information light and an optical path of the reference light.

4. An information recording apparatus according to claim 1, further comprising, when the Fourier transform optical system is a first Fourier transform optical system and the optical path shifter is a first optical path shifter:

a second Fourier transform optical system that subjects, during reproduction of information, light reproduced from the recording medium when the reference light is irradiated on the recording medium from a direction identical with that during recording to inverse Fourier transform;

a readout unit that receives the light reproduced from the recording medium through the second Fourier transform optical system and reads out information recorded as the interference image; and a second optical path shifter located between the second Fourier transform optical system and the recording medium, and having an optical device configured to move relatively with respect to the second Fourier transform optical system so as to move a reading spot in a circular shape around an optical axis of the second Fourier transform optical system when information is reproduced.

5. An information recording apparatus that causes information light and reference light to interfere with each other and records an interference image on a recording medium, the information recording apparatus comprising:

a fixed light source that emits coherent light;

a modulation element that modulates a part of light emitted from the light source to emit modulated light as information light having information that should be recorded on the recording medium and modulates a remainder of the light when necessary to emit the remainder of the light either modulated or intact as reference light;

a Fourier transform optical system that leads the light emitted from the modulation element to the recording medium; and an optical path shifter located between the Fourier transform optical system and the recording medium, and having an optical device configured to move relatively with respect to the fixed light source so as to move a recording spot in a circular shape around an optical axis of the Fourier transform optical system when the interference image is recorded.

6. An information recording apparatus according to claim 5, wherein a light incidence area of the modulation element is divided into a first incidence area on which a part of the light emitted from the light source is made incident and a second incidence area on which the remainder of the light is made incident.

7. An information recording apparatus according to claim 6, wherein the first incidence area and the second incidence area are divided in a concentric circle shape.

8. An information recording apparatus according to claim 6, wherein the first incidence area and the second incidence area are formed in a shape symmetrical with respect to a surface including the optical axis of the Fourier transform optical system.

9. An information recording apparatus according to claim 5, wherein the recording medium is a reflection type, the Fourier transform optical system subjects, during reproduction of information, light reproduced from the recording medium when the reference light is irradiated on the recording medium from a direction identical with that during recording to inverse Fourier transform, and the information recording apparatus further includes a readout unit that receives the light reproduced from the recording medium through the optical path shifter and the Fourier transform optical system and reads out information recorded as the interference image.

10. An information recording apparatus according to claim 9, wherein the modulation element emits, during retrieval of information, a part of the light emitted from the light source according to retrieved information, and the readout unit receives, when the light modulated according to the retrieved information by the modulating element is irradiated on the recording medium via the Fourier transform optical system, reproduced light from the recording medium including a result of calculation of a correlation between a Fourier image of the light and the interference image recorded on the recording medium.

11. An information recording apparatus according to claim 1, wherein the optical path shifter includes:

a deflection unit that translates the optical path of the light, which is led from the Fourier transform optical system to the recording medium, in the direction perpendicular to the optical axis of the Fourier transform optical system; and a shifter driving unit that rotates, every time the interference image is recorded, the deflection unit around the optical axis of the Fourier transform optical system.

12. An information recording apparatus according to claim 11, wherein the deflection unit has a pair of deflection optical elements arranged to be opposed to each other via a void, and one deflection optical element is arranged to be plane symmetrical to the other deflection optical element with respect to a surface perpendicular to the optical axis of the Fourier transform optical system when the other deflection optical element is rotated 180 degrees around the optical axis.

13. An information recording apparatus according to claim 12, wherein the pair of deflection optical elements include prisms, respectively.

14. An information recording apparatus according to claim 13, wherein the pair of deflection optical elements are arranged such that slopes of the respective prisms are opposed to each other via a void.

15. An information recording apparatus according to claim 12, wherein the pair of deflection optical elements include diffractive optical elements, respectively.

16. An information recording apparatus according to claim 15, wherein the respective diffractive optical elements have blazes formed on one surfaces thereof and are arranged such that the surfaces on which the blazes are formed are opposed to each other via a void.

17. An information recording apparatus according to claim 11, wherein the deflection unit has a diffractive optical element in which blazes are formed on a surface on a light incidence side and a surface on a light emission side, and the surface on the light emission side of the diffractive optical element is arranged to be plane symmetrical to the surface on the light incidence side with respect to a surface perpendicular to the optical axis of the Fourier transform optical system when the surface on the light incidence side is rotated 180 degrees around the optical axis.

18. An information recording apparatus according to claim 1, further comprising a disk driving unit that shifts the recording medium every time the recording spot is rotated once around the optical axis of the Fourier transform optical system by the optical path shifter.

19. An information reproducing apparatus that reproduces information recorded on a recording medium as an interference image, the information reproducing apparatus comprising:
- a fixed light source that emits coherent light;
- a reference-light irradiation optical system that leads a part of the light emitted from the light source to a recording medium as reference light;
- an inverse Fourier transform optical system that subjects light reproduced from the recording medium when the reference light is irradiated on the recording medium to inverse Fourier transform;
- a readout unit that receives the reproduced light through the inverse Fourier transform optical system and reads out the information recorded as the interference image; and
- an optical path shifter located between the inverse Fourier transform optical system and the recording medium, and having an optical device configured to move relatively with respect to the fixed light source so as to move a reading spot in a circular shape around an optical axis of the inverse Fourier transform optical system when the information is reproduced.

20. An information reproducing apparatus according to claim 19, wherein the reference-light irradiation optical system includes a splitting optical system that splits the light emitted from the light source into two light beams and leads one of the light beams to the recording medium as the reference light.

21. An information reproducing apparatus according to claim 19, wherein
the reference-light irradiation optical system includes:
- a modulation element that modulates a part of the light emitted from the light source when necessary and emits the part of the light either modulated or intact as reference light; and
- a Fourier transform optical system that leads the reference light emitted from the modulation element to the recording medium, wherein
the inverse Fourier transform optical system subjects light reproduced from the recording medium when the reference light is irradiated on the recording medium through the Fourier transform optical system to inverse Fourier transform.

22. An information reproducing apparatus according to claim 19, wherein the optical path shifter includes:
- a deflection unit that translates an optical path between the recording medium and the inverse Fourier transform optical system in the direction perpendicular to the optical axis of the inverse Fourier transform optical system; and
- a shifter driving unit that rotates, every time the information is reproduced, the deflection unit around the optical axis of the inverse Fourier transform optical system.

* * * * *